April 28, 1964 A. F. PILLSBURY, JR., ETAL 3,130,933

MAGNETIC TAPE APPARATUS

Filed Dec. 15, 1960

ALBERT F. PILLSBURY, JR.
NELSON C. YEW
INVENTORS

BY Nathan N. Kallman

ATTORNEY

United States Patent Office 3,130,933

Patented Apr. 28, 1964

3,130,933
MAGNETIC TAPE APPARATUS

Albert F. Pilsbury, Jr., and Nelson C. Yew, Palo Alto, Calif., assignors to Ampex Corporation, Redwood City, Calif., a corporation of California Filed Dec. 15, 1960, Ser. No. 75,963
2 Claims. (Cl. 242—55.12)

This invention relates to magnetic tape apparatus, and in particular to a novel means for extending the life of magnetic tapes.

Presently known magnetic tapes employ a ferromagnetic oxide which is deposited with the aid of binders on a substrate, formed from Mylar or an acetate. During operation of a magnetic tape apparatus, the magnetic tape is moved across a transducing gap or gaps formed in a magnetic transducer or head assembly for recording or reproducing signal information. In one form, magnetic transducers or heads are fabricated from Permalloy or Mumetal. In another form, the transducers may have pole pieces adjacent to the transducing gap, such pole pieces consisting of Alfenol, Thermenol, or ferrite. Such materials tend to score the tape oxide layer, or particles of these materials may be abraded and adhere to the oxide layer, causing undesirable wear patterns, gouged areas, and undulated portions along the tape layer.

Furthermore, if "soft" binder materials are used for depositing the magnetic oxide layer on a tape, the binder may erode so that the oxide particles become loose and tend to conglomerate along the tape and also on the surface of the magnetic head adjacent to the gap. If there are many such accumulations or if the accumulations become large and extensive, when added to the wear patterns, gouged areas, and undulated portions, signal dropouts results and the usable life of the tape may be substantially reduced, or equipment failure may occur.

It is an object of this invention to provide a novel means for extending the life of magnetic tape.

It is another object of this invention to provide a means for minimizing dropouts and for improving the performance of magnetic tape.

According to this invention, a magnetic tape apparatus comprises a lubricating means, which may utilize a fluorocarbon such as tetrafluoroethylene or the commercially available DuPont "Teflon" (TFE) for example, for coating a magnetic oxide layer of the tape with a very thin lubricating film during operation of the apparatus. The fluorocarbon film, which has an extremely low coefficient of friction and anti-adhesive properties, provides a low-friction tape layer for contact with magnetic transducers and pole pieces and other mechanical parts which engage the tape, thus substantially reducing the deleterious effects of friction and minimizing the accumulation and caking of loose oxide particles. With continued operation, thin films of the low friction material are deposited on the transducers and pole pieces and tape guides in addition to the tape, thereby providing contact between low friction films coating the several mechanical parts and the magnetic tape. In this manner, the life of a magnetic tape may be extended appreciably.

The invention will be described in greater detail with reference to the accompanying drawing in which.

Figures 1, 2, 3, 4:
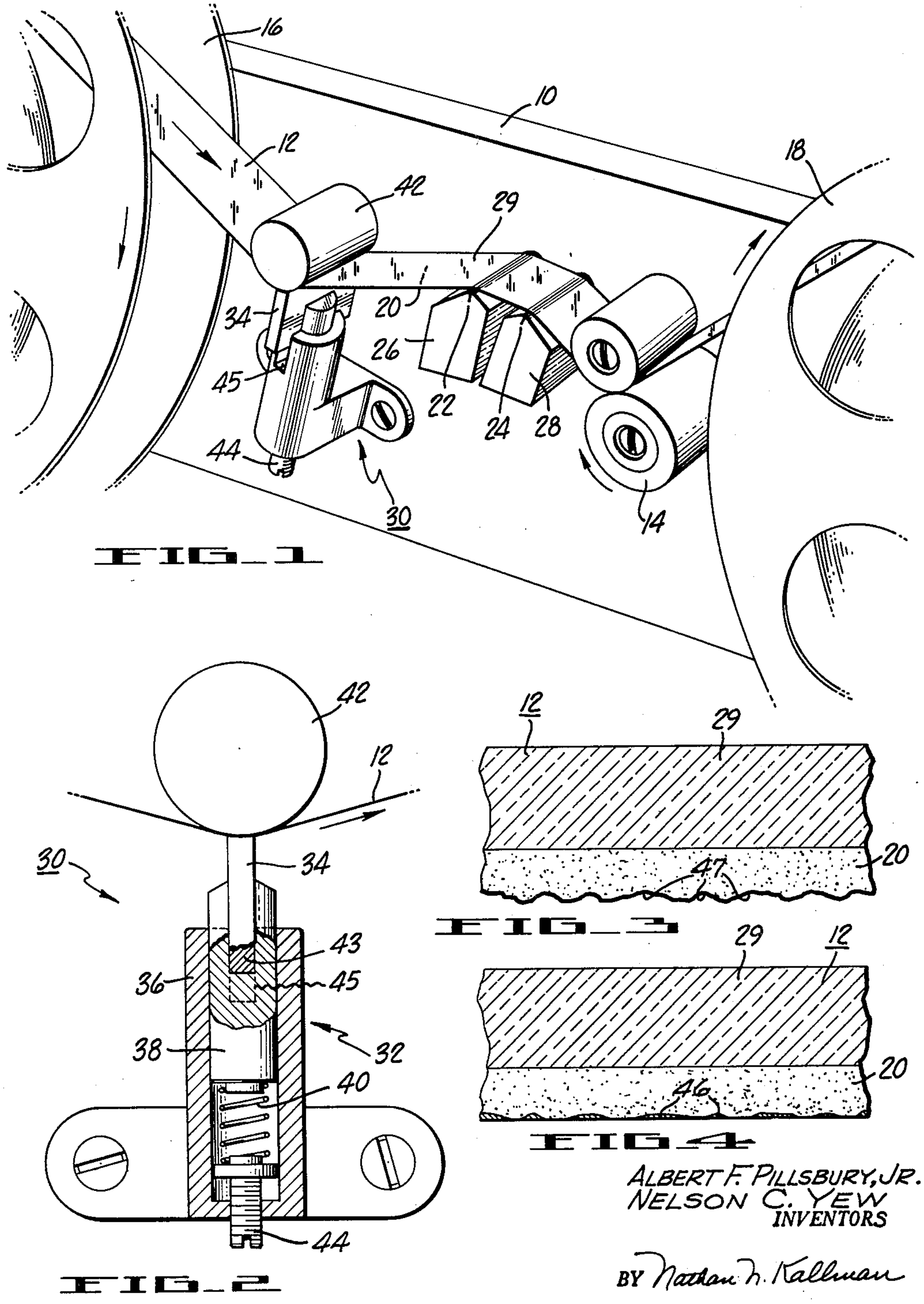
FIGURE 1 is a perspective elevational view of a magnetic tape apparatus, in accordance with the invention.
FIGURE 2 is a sectional view of a device, partly broken away, for applying a lubricating film to a tape, according to the invention.
FIGURE 3 shows an edge view of a magnetic tape (the layers not being in exact proportion), as found in the prior art when used in a magnetic tape apparatus.
FIGURE 4 shows an edge view of a magnetic tape in approximately the same proportions as in FIGURE 3, having a material with a low coefficient of friction deposited thereon, as disclosed by this invention.

As shown in FIGURES 1–4, a magnetic tape apparatus comprises a support 10 on which a magnetic tape 12 is driven by a capstan 14 disposed between a tape supply means 16 (partly shown) and a tape takeup means 18 (partly shown). A magnetic oxide layer 20 (see FIGURES 3 and 4) on the tape 12 is disposed so that during operation of the apparatus, transducing gaps 22 and 24 formed in magnetic transducers 26 and 28, respectively, contact the oxide layer 20 for transducing an information signal. The oxide layer 20 is bound to one surface of a base 29 such as Mylar.

In accordance with this invention, a lubricating device 30, illustrated in FIGURES 1 and 2, is incorporated into a simplified tape apparatus, shown by way of example. The tape apparatus set forth is merely representative of presently known recorders, but it is understood that the invention is also applicable generally in any magnetic tape apparatus. The lubricating device 30 may comprise a holding means 32 for securing a lubricating material 34 such as Teflon, in contiguous relationship with the magnetic oxide layer 20 on the tape 12. The holding means 32 includes a cylindrical type housing 36 which is fixed to the support 10. Within the housing 36, a slotted carrier 38, which may freely slide along the inner housing wall, is seated on a resilient means or spring 40 which urges the carrier 38 towards a fixed post 42. The post 42 is disposed adjacent to the path of tape travel, and on the opposite side of the tape 12 with respect to the lubricating device 32.

A bar of lubricant 34 or Teflon rests within a slot 43 of the carrier 38 and is movable within a cooperating slot 45 formed in the housing 36 that is aligned with the carrier slot 43. During operation of the tape apparatus the lubricant 34 contacts the tape across its entire width. The urging force of the spring 40 is applied perpendicularly to the surface of the oxide layer 20 and to the path of tape travel at the point of contact between the tape 12 and the Teflon 34. The spring force may be adjusted by means of a screw 44 which projects from the housing 36, and affords compression or expansion of the spring 40. As the tape 12 is moved from the supply means 16 to the takeup means 18, the lubricating material 34 is spread across the surface of the tape 12 and fills in the depressions 47 (shown in FIGURE 3) to form a substantially smooth and level lubricating film 46 (such as shown in FIGURE 4).

The application of Teflon to magnetic tapes has been found to improve their performance characteristics, especially that of the "soft" binder oxide type, and has increased the life of magnetic oxide tapes extensively. In fact, a series of tests have shown that the life of tapes used for digital computer type recorders was increased by 10 to 20 times, based upon an acceptance criterion established by the magnetic tape recording industry. Thus, tapes were successfully used for approximately 65,000 passes in contrast to a normal life of about 3,000 passes. The tapes used in these tests had a Mylar base of about .001–.0015 inch, an oxide layer of .0004 inch, and the deposited Teflon layer measured after completion of the tests was less than 100 microinches.

Teflon is one of the fluorocarbons described in the textbook "Fluorocarbons" by M. A. Rudner, published by the Reinhold Publishing Corporation of New York in 1958. The notable characteristics of Teflon are that it has an extremely low coefficient of friction and is anti-adhesive. Therefore, Teflon is most desirable as a friction-reducing coating, and provides the additional feature that foreign materials do not adhere to the surface of a Teflon layer. Furthermore, Teflon is substantially chemically inert, has no appreciable change in its composition, and thus does not affect materials to which it is applied. Teflon also is unaffected by outdoor weathering or moisture and has a very low water absorption characteristic, thereby protecting the coated materials to which it is applied.

By applying a lubricant, such as Teflon, having a non-adhesive property and also having a low coefficient of friction to the surface of a magnetic tape, maintenance, repair, and replacement costs are appreciably reduced for a magnetic tape apparatus, in addition to improving the performance characteristics of the tape apparatus.

If desired, a pneumatic device (not shown) for detaching loose oxide particles or other foreign material may be located adjacent to the oxide layer 20 along the path of tape travel, and between the lubricant applying device 30 and the magnetic transducers 26 and 28. The pneumatic device may provide a vacuum for example to dislodge such objectionable material, and it is understood that a plurality of pneumatic devices may be employed for this purpose.

It is also understood that this invention encompasses the use of lubricants or fluorocarbon resins other than Teflon which have an extremely low coefficient of friction and non-adhesion properties. For example, "Kel-F," a trifluorochloroethylene manufactured by M. W. Kellogg Co. or "Fluoroethene" made by Union Carbide and Carbon Corp. may be utilized to provide extension of tape life and improved performance.

Also, the invention is not limited to the form of Teflon or the mechanical device for applying the lubricant described heretofore. Liquid dispersions or air sprays for depositing a thin film of Teflon may be utilized, and more than one applying means may be incorporated into the tape apparatus. Furthemore, the magnetic medium need not comprise a tape supporting an oxide layer, but may be a drum or a disk or any other configuration which has a magnetic oxide layer that has relative movement to other mechanical parts.

In addition, the invention may be applied so that a magnetic tape is fabricated prior to use in a tape apparatus comprising a magnetic material disposed on a supporting base, and a thin layer or film of a lubricant having an extremely low coefficient of friction, such as Teflon, deposited on the magnetic material.

What is claimed is:

1. A magnetic tape apparatus for moving a magnetic tape past a transducing means, said tape having a magnetic oxide layer on one surface thereof comprising: means for supplying said tape to said transducing means; means for takeup of said tape after said tape has traversed said transducing means; a bar of Teflon; means for causing frictional engagement of said bar with said oxide layer, said last-named means comprising resilient means disposed adjacent to said oxide layer surface for urging said bar of Teflon against said oxide layer and a fixed tape guide for engaging the opposite surface of said tape.

2. A magnetic tape apparatus for moving a magnetic tape in a downstream direction on a predetermined path past a transducing means, said tape having a magnetic oxide layer on one surface thereof comprising: means mounted at the upstream end of said path for supplying said tape to said transducing means; means at the downstream end of said path for takeup of said tape after said tape has traversed said transducing means; a bar of Teflon; means for causing frictional engagement of said bar with said oxide layer at a point on said path immediately upstream from said transducing means, said last-named means comprising resilient means disposed adjacent to said oxide layer surface for urging said bar of Teflon against said oxide layer and a fixed tape guide for engaging the opposite surface of said tape.

References Cited in the file of this patent

UNITED STATES PATENTS

| | | |
|---|---|---|
| 1,211,429 | Frank | Jan. 9, 1917 |
| 2,426,838 | Miller | Sept. 2, 1947 |
| 2,607,710 | Schmelzle et al. | Aug. 19, 1952 |
| 2,699,332 | MacKenzie | Jan. 11, 1955 |
| 2,778,636 | Eash | Jan. 22, 1957 |
| 2,819,186 | Franck | Jan. 7, 1958 |

OTHER REFERENCES

High Fidelity Magazine, DuPont Advt. (page 35) March 1959.

Tape Recording, DuPont Advt. (Rear Cover) October 1958.